Figure 1:
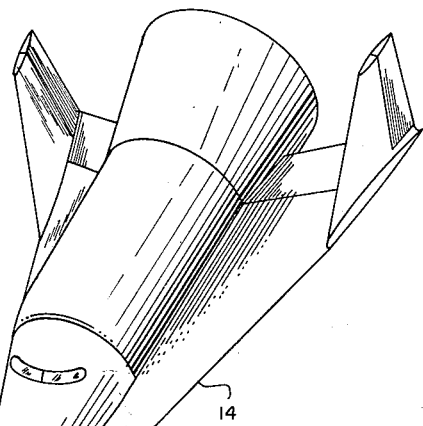

July 27, 1965 D. H. BLACK 3,197,087
FLUID TRANSPORTING SYSTEM
Filed Feb. 27, 1964

INVENTOR,
DOLPHUS H. BLACK
BY
ATTORNEYS

3,197,087
FLUID TRANSPORTING SYSTEM
Dolphus H. Black, Rte. 1, Arab, Ala.
Filed Feb. 27, 1964, Ser. No. 347,959
1 Claim. (Cl. 222—386.5)
(Granted under Title 35, U.S. Code (1952), sec. 266)

The invention described herein may be manufactured and used by or for the government of the United States of America for governmental purposes without the payment of any royalties thereon or therefor.

This invention relates to a fluid transporting system and more particularly to a fluid discharge apparatus especially adapted for storing, transporting and dispensing cryogenic or highly corrosive fuels in spacecraft refueling operations.

As man undertakes future exploration of the universe by manned voyages in various types of spacecraft, the problem surrounding the transfer of supplies from a tanker or mother spacecraft to the manned vehicle will become increasingly important. Not only must the necessary supplies required to support man himself be shifted from one spacecraft to another in the hostile vacuum environment existing in outer space, but cryogenic and highly corrosive fuels for use in the propulsion of the space vehicle must also be transferred. It is this refueling operation that presents one of the most formidable problems in the rendezvous technique of space exploration.

Since gravitational forces are, for all practical purposes, non-existing aboard an orbiting spacecraft, the normal methods and devices employed on earth for transferring liquids from one container to another cannot be used in outer space. Furthermore, the extreme forces exerted upon a fully loaded liquid container as it is rocketed into orbit is such as to rupture most expulsive type containers made by heretofore accepted standards. This is particularly true in those instances where an expulsion bladder has been employed as a liquid transferring medium. Such expulsion bladders not only tend to rupture under the accelerating forces present during a launch, but their use requires that the inside surface of the container be extremely smooth to prevent puncturing of the bladder from occuring. An even more serious limitation on the use of these expulsion bladders is their incompatibility with most cryogenic and highly corrosive fuels.

In an effort to devise a suitable method and apparatus for transferring fuels under zero gravitational conditions, it has been proposed that the tanker spacecraft be accelerated prior to the transfer operation thereby providing a positive force on the fuel. This would permit the fuel to then be pumped or forced out by gas pressure. Such a fluid transfer procedure is objectionable, however, since not only does it involve added weight that must be carried by the tanker spacecraft in the form of accelerating and pumping systems, but the acceleration of the craft alters its orbit, attitude, etc., thus greatly multiplying the complexity of the chase craft rendezvousing with the tanker.

According to the present invention it has been found that a fluid container can be constructed for carrying and transferring fluids under vacuum and zero gravitational conditions which is extremely light, reliable and inexpensive to produce. Furthermore, no special finishing of the inside of the container is necessary for its proper operation and the container is compatible with all cryogenic and highly corrosive fuels.

This novel fluid container consists of a fluid tight enclosure having a thin sheet of metal disposed therein to divide the enclosure into a pressure chamber or compartment and a discharge chamber. The sheet metal transfer system is preferably shaped to conform with the inside surface of the enclosure forming the pressure chamber and has its edge or peripheral section secured to the inside of the enclosure. When the discharge chamber of the enclosure is filled with a fluid, the sheet metal transfer system will be pressed against the inside of the enclosure forming the pressure chamber thus permitting the maximum amount of fuel to be stored. To empty the enclosure, a fluid or gas pressure is introduced into the pressure chamber thereby causing the sheet metal transfer system to buckle outwardly as it moves toward the center of the enclosure. Once the transfer system has passed the center of the enclosure, the pressure in the discharge chamber can be decreased or released completely since the system will now buckle toward the discharge chamber thereby assisting in expelling the remainder of the fluid contained therein.

Accordingly, the primary object of this invention is to provide a simple, highly reliable, light and inexpensive storage system for transferring and dispensing cryogenic or highly corrosive fuels in a zero gravitational and vacuum environment.

Another object of this invention is to provide a fluid storage and dispensing apparatus having a metal sheet transfer system.

Yet another object of this invention is to provide a fluid storage and dispensing apparatus for use in outer space which does not require the constant pressurization of the container to effect the expulsion of fluids therefrom.

Figure 2:
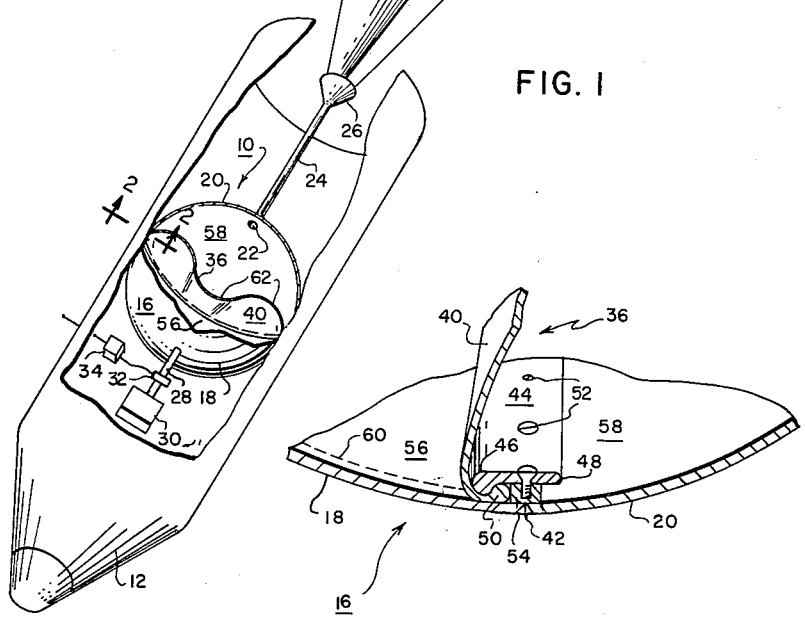

These and further objects and advantages of this invention will become more apparent upon reference to the following specification, appended claim and drawings wherein:

FIGURE 1 is a perspective view with parts broken away showing a storage system constructed in accordance with this invention in use for refueling an orbiting spacecraft; and FIGURE 2 is an enlarged view of a portion of the storage system taken along line 2—2 of FIGURE 1.

With continued reference to the accompanying drawings, wherein like reference numerals designate similar parts, and with initial attention directed to FIGURE 1, reference numeral 10 is usd to generally designate a fluid transporting system constructed in accordance with this invention. For purposes of illustration, the fluid system 10 is shown carried by an orbiting space tanker 12 which is being used to refuel a manned space vehicle 14. It is to be realized, however, that the fluid storage and transfer system can be used for numerous other purposes and in a number of different environments other than the one illustrated.

As seen in FIGURE 1, the fluid system 10 consists in part of a spherical shaped tank 16 constructed from two halves 18–20 that has substantially the same inside dimensions for reasons that will be more fully set forth hereinafter. The tank 16 can be constructed of any suitable material that will withstand the corrosive action of the fluid to be transported and the shock to be encountered during shipment. The general configuration of the tank 16 is not restricted to any one paricular shape, but can be formed to fit within any given area so long as the inner dimensions of the two halves 18 and 20 are substantially identical.

Each half of the tank 16 is provided with a port, one of which is shown at 22 in the tank half 20. This particular port is connected by a tube 24 to a cone shaped valve fitting 26 into which the nose of the spacecraft 14 is inserted when it is undergoing a refueling operation in much the same manner as an aircraft is refueled in flight. The port in the tank half 18 is not shown but is connected through a tube 28 to a gas pressurized tank 30. For purposes of controlling the flow of gas from the pressurized tank 30 into the tank 16, a valve 32, which is operated by a command receiver unit or any other suitable control unit, is inserted in the tube 28 between the tanks 16 and 30.

Since there is little or no gravitational forces present aboard the orbiting space tanker 12, some transfer system other than the conventional ones used in and dependent on the presence of a gravitational field must be provided within the tank 16. Such a transfer system which is not only strong enough to withstand the accelerating and sloshing forces produced within the tank 16 when the space tanker 12 is being accelerated or decelerated, but is extremely reliable, light and easily operated as shown at 36 in FIGURES 1 and 2. This transfer system consists of a thin, highly-flexible metal diaphragm 40, preferably formed from stainless steel and having a thickness between .0005 and .002 inch, that is secured in place at approximately the equator 42 of the spherical tank 16 by a clamp ring 44.

As more clearly seen in FIGURE 2, the clamp ring 44 is formed as a flat ring having a smoothly curved lip 46 formed on one edge thereof and a gradually tapered trailing edge 48 formed on the other edge thereof. When the clamp ring and the metal diaphragm 40 are properly assembled, the lip 46 serves to tightly grip and securely hold the edge of the metal diaphragm in such a manner as to prevent both the slippage of the diaphragm from under the ring and the leakage of any gases therearound. To assist in this gripping of the diaphragm 40 by the clamp ring 44, a ridge or ring 50 is provided on the peripheral edge of the diaphragm. The clamp ring itself is secured to the wall of the tank 16 by a plurality of bolts 52 which are threadedly received in a ring support 54 that is welded or otherwise secured to the tank half 18.

Since the two halves 18 and 20 used to form the tank 16 must of necessity be securely bonded together in a gas tight manner, and since welding or brazing is the preferred method of forming such a bond, the location of the ring support 52 in the manner shown in FIGURE 2 is quite important. This is true since that portion of the ring support that extends over the inner face of the two halves, or the equator 42 of the tank 16 in this particular instance, acts as a welding back-up bar for dispensing heat and preventing welding impurities from entering the tank during the securing of the two halves together. If necessary, a sealing agent can also be placed between this portion of the ring support and the tank during assembly to further insure that no leakage between these parts will occur.

Once the flexible metal diaphragm 40 is properly secured in place within the tank 16, it will be noted that the tank is effectively divided into two independent chambers or compartments 56 and 58 whose volume will vary depending on the position of the diaphragm within the tank. The first compartment 56 is for receiving pressurized gas from the pressure tank 30 while the second compartment 58 is for receiving and holding the fluid being transported.

For purposes of illustrating the operation of the fluid storage and transfer system it will be assumed that the tank 16 is completely filled with a fluid and that the spacecraft 14 has properly docked and is ready to take on fuel. With the tank 16 completely filled with a fluid, the flexible metal diaphragm will be pressed against the inner surface of the tank half 18 in the manner shown by the broken lines 60 and, since the thickness of the diaphragm is very small (approximately .0005 to .002 inch), the liquid storing compartment 58 will be at its maximum volume which is substantially equal to that of the tank 16. Conversely, with the diaphragm 40 pressed against the tank half 18, the volume of the pressurized gas compartment 56 will have its minimum volume.

With the spacecraft 14 in position and the proper connections made between its fuel tanks and the valve 26, a signal is transmitted from the craft through the command receiver 34 to the valve 32 thereby opening the valve. With the valve opened the gas contained in the pressurized tank 30 is permitted to flow into the compartment 56 of the tank 16. As the pressure of the gas increases within the compartment 56, the flexible metal diaphragm will be forced away from the inner wall of the tank half 18 and toward the inner wall of the tank half 20. This movement of the diaphragm will result in the volume of the compartment 58 being decreased and fluid being forced under pressure through the tube 24 into the fuel tanks of the spacecraft 14.

As the flexible metal diaphragm 40 moves toward the center of the tank 16, various buckling or wrinkling of the diaphragm will occur as more clearly shown at 62 in FIGURE 1. This is necessary since if the diaphragm did not buckle no movement thereof would occur. Once the movement of the diaphragm 40 has passed the middle of the tank 16 (as shown in FIGURE 1), very little or no further pressurizing of the compartment 56 is necessary to expel the fluid remaining in the compartment 58 since the diaphragm will now move toward the inner wall of the tank half 20 under its own force due to the presence of the buckles 62 formed therein. This is very important since it permits the use of a minimum amount of gas from the tank 30 thereby permitting a smaller tank to be used which, in turn, saves weight and increases reliability.

Since any crimping or abrupt bending of the flexible metal diaphragm 40 would result in a rupture occurring therein, the edges 46 and 48 of the clamp ring 44 are rounded as mentioned hereinabove. This permits the diaphragm to gradually bend around the clamp ring thus preventing the crimping of the diaphragm that would otherwise occur. Once all the fluid in the compartment 58 is expelled from the tank 16, the diaphragm 40 will rest against the inner wall of the tank half 20 and the compartment 58 will have its volume reduced to substantially zero and compartment 56 will be at its maximum volume.

To refill a compartment 58 it is only necessary that the diaphragm 40 be forced into its original position against the inner wall of the tank half 18 and fluid be placed in the compartment 58. The diaphragm can be moved back to this original position by either drawing a vacuum in compartment 56 if the tank is being used in a pressurized atmosphere or by forcing a gas or fluid, which can be the fluid to be transported, into compartment 58.

From the foregoing it will be seen that a new and novel fluid storage and transfer system, which is especially adapted for use in refueling space vehicles which are in orbit, has been described. The use of a highly flexible metal diaphragm for dispensing the fluids by the tanker spacecraft not only gives a more reliable and lighter system, since a very small amount of pressurizing fluid is required for its operation, but such a system is also easier and thus less expensive to manufacture than other heretofore known tanker systems. The additional strength of the metal diaphragm over other known units of this type substantially eliminates the possibility that a rupture or tear in the diaphragm will occur due to sloshing or accelerating forces, or that the diaphragm will be torn on a sharp surface within the tank.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes that come within the meaning and range of equivalency of the claim are intended to be embraced therein.

What is claimed and desired to be secured by the United States Letters Patent is:

A fluid transporting system adapted for use in transferring a fluid from a container to an orbiting spacecraft comprising:

(a) a fluid transporting tank having at least one inlet port at one end thereof and at least one outlet port at the other end thereof, said tank being formed of two halves having substantially hemispherical inner surfaces joined together by welding at their edges to form a spherical container;

(b) ring means arranged in said tank and positioned over the weld joint so as to serve as a welding back-up bar during the welding operation, said ring means consisting of a continuous flat ring having a smoothly curved lip formed on one edge thereof and a gradually tapered trailing edge formed on the other edge thereof;

(c) a highly flexible hemispherical shaped metal diaphragm arranged in and secured to said tank by said ring means thereby dividing said spherical container into a first and second fluid chamber, (1) the lip of said ring means being adapted to grip and hold the edge of said flexible metal diaphragm while the smooth edge of said ring is adapted to prevent crimping of the peripheral edge of said diaphragm, (2) said flexible metal diaphragm being adapted to fit the interior contour of said chambers and to be alternately driven under pressure from engagement with the interior contour of one chamber into engagement with the interior contour of the other chamber, (3) said inlet port being located in said first chamber and said outlet port being located in said second chamber, (4) said flexible metal diaphragm being normally positioned against the interior contour of said first chamber when said second chamber is filled with the fluid to be transferred to said orbiting spacecraft;

(d) means for conducting a pressure producing medium through said inlet port into said first chamber thereby buckling said flexible metal diaphragm away from the interior contour of said first chamber and toward the interior contour of said second chamber so that said fluid is dispensed from said second chamber through said outlet port, said flexible metal diaphragm being adapted to continue toward the interior contour of said chamber through its unbuckling action after said diaphragm has been forced past the equator of said spherical container by said pressure producing medium so that said fluid will continue to be dispensed from said second chamber after said pressure producing medium has been removed from said first chamber; and (e) means connected to said outlet port of said tank for conducting said fluid being dispensed from said second chamber by the movement of said flexible metal diaphragm to said orbiting spacecraft.

References Cited by the Examiner

UNITED STATES PATENTS

| | | | |
|---|---|---|---|
| 2,394,401 | 2/46 | Overbeke | 92—98 X |
| 2,731,297 | 1/56 | Meyer | 222—386.5 X |
| 2,889,078 | 6/59 | Thomas | 222—95 |
| 2,924,359 | 2/60 | Beremand | 222—386.5 |
| 3,097,766 | 7/63 | Biehl et al. | 222—386.5 |
| 3,137,317 | 6/64 | Peters | 138—30 |

LOUIS J. DEMBO, *Primary Examiner.*